Figure 1:
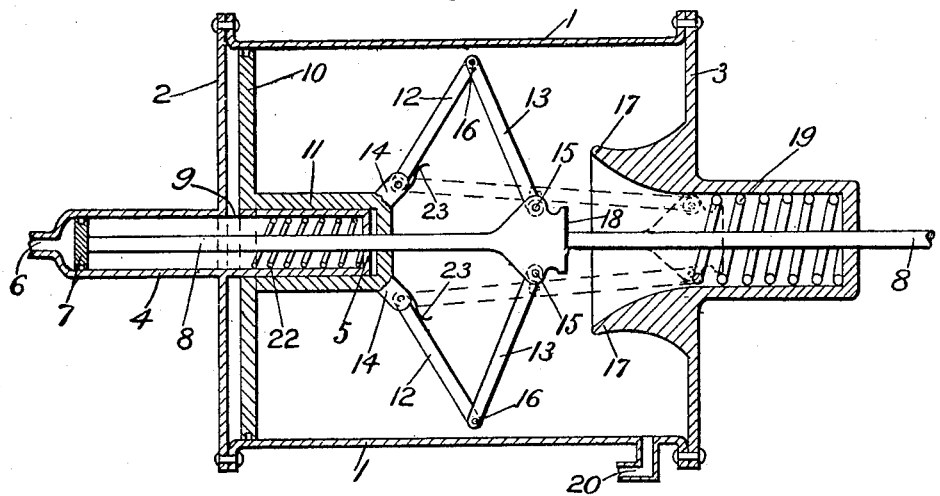

F. B. RAE.
AIR BRAKE.
APPLICATION FILED JUNE 23, 1903.

920,389.

Patented May 4, 1909.

Witnesses
George K. Kerr.
Anthony J. Ernest.

Frank B. Rae, Inventor
By his Attorney
C. V. Edwards

UNITED STATES PATENT OFFICE.

FRANK B. RAE, OF NEW YORK, N. Y., ASSIGNOR, BY MESNE ASSIGNMENTS, TO RAE ELECTRIC COMPANY, A CORPORATION OF MICHIGAN.

AIR-BRAKE.

No. 920,389.  Specification of Letters Patent.  Patented May 4, 1909.

Application filed June 23, 1903. Serial No. 162,728.

*To all whom it may concern:*

Be it known that I, FRANK B. RAE, a citizen of the United States, residing at New York, in the county of New York and State of New York, have invented certain new and useful Improvements in Air-Brakes, of which the following is a full, clear, and exact specification.

This invention relates to air brakes and has for its objects to reduce the quantity of air necessary to apply the brake, and, at the same time, to provide a brake mechanism which shall be of high efficiency.

It is well known that a large portion of the air used in applying brakes is practically wasted in taking up the slack in the brake rigging and that only a small proportion of the air used is actually effective in pressing the brake shoe against the wheel. To reduce this waste as much as possible, various mechanical devices for holding the shoes near the wheels and for taking up the slack due to necessary looseness have been devised. As the brake shoe and the other parts wear, the amount of air used ineffectively becomes very large. The economy of air is a feature of much importance in the storage air brake systems and I have devised the present improvements for use in connection with such systems, though I do not restrict myself to such a use as the invention is equally valuable in any system of fluid pressure actuated brakes.

The invention consists broadly in the provision of means for taking up the slack in the brake rigging before admitting pressure to the brake cylinder. I attain this result by a brake mechanism actuated first by a relatively small amount of air to take up the slack in the brake rigging and further actuated by a larger amount of air to apply the effective braking pressure. In the embodiment of the invention which I will describe, this result is attained by means of two pistons working on the brake rod, one of relatively small area for taking up the slack in the brake rigging, and the other, of relatively large area, for applying the braking pressure after the slack has been taken up. In the construction herein illustrated the small or auxiliary piston controls the admission of pressure to the large or main piston, so that the main piston does not move until the slack has all been taken up, whereupon both pistons are automatically locked together and moved further to apply the brake. By using both pistons for applying the brake, the greatest economy of air is secured, but independent pistons could be used, one for taking up the slack and the other for applying the brake with a considerable economy over present methods of applying brakes.

The invention will be more particularly described with reference to the accompanying drawings, in which—

Figure 2:
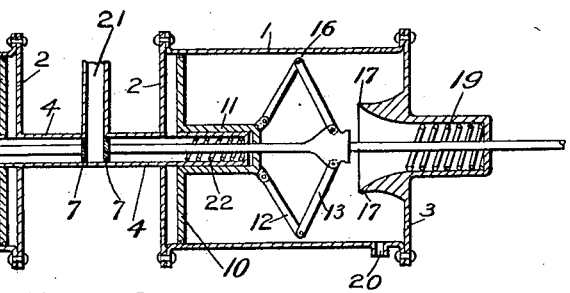

Figure 1 is a longitudinal section of a single brake cylinder embodying my invention. Fig. 2 is a longitudinal section of a double brake cylinder embodying the invention.

1 represents a brake cylinder having the heads 2 and 3 of ordinary construction. Attached to the head 2 is an auxiliary cylinder 4 which is located partly within and partly without the main cylinder 1 and has a head 5, a port 6 leading to suitable source of pressure and a piston 7. Attached to the piston 7 is a brake rod 8 which passes through both cylinders and is suitably connected to a brake beam or brake shoe. Leading from the auxiliary cylinder 4 to the main cylinder 1 is a port 9. Within the main cylinder 1 is a main piston 10 which has a cylindrical extension 11 mounted to slide on the inwardly projecting portion of the auxiliary cylinder 4. Attached to the extension 11 of the piston 10 are toggles 12 and 13 pivoted together at 16. The toggles 12 are pivoted on lugs 14, carried by the main piston 10, and the toggles 13 are pivoted at 15 to a head 18 on the brake rod 8. Attached to the main cylinder is a suitable cam 17, the function of which will be explained hereafter. 20 is a port adapted to be connected with the engineer's valve. The leaf springs 23 are provided to double the toggles and return them from the dotted position to normal position, as shown in Fig. 1.

22 is a spring to aid in returning the auxiliary piston 7 to normal position.

Referring to Fig. 2 the construction is the same except that one port 21 lets pressure against two auxiliary pistons simultaneously, working in opposite directions.

The port 6 is connected with a suitable air supply and when pressure is admitted thereto the piston 7 is driven forward until the port 9 is uncovered allowing the pressure to act on the larger piston 10. The piston 7 in moving a distance sufficient to uncover the port 9 moves the brake rod and the head 18 far enough forward to compress the spring 19 and straighten the toggles 12 and 13 which are prevented from doubling up by the cam 17. As soon as the port 9 is uncovered, the pressure can act on both pistons and a rigid structure is secured because the toggles are prevented from doubling up by the cam 17. The movement of the piston 7 to uncover the port 9 is sufficient to take up all of the slack in the brake rigging and to bring the brake shoes in contact with the wheels. The pistons 7 and 10 then move together to apply the effective braking pressure through the toggles and the rod 8. The springs 19, 22 and 23 serve to return the parts to normal position. In Fig. 2 the action is the same except that both cylinders are controlled from one supply pipe 21.

It will be seen that by this construction I have provided mechanism in which a minimum of air will be used and yet one in which the efficiency of the brake will not be sacrificed. The area of the piston 7 will be so proportioned that sufficient pressure can be applied so as to take up the slack in the brake rigging and the braking pressure will then be applied through both pistons acting in conjunction on the brake rod 8. With the old constructions it has been necessary to take up the slack and apply the brake with one piston, thus requiring a large quantity of air. By taking up the slack with a small piston and then applying the brake with a large piston a great economy in the consumption of air is secured.

An important feature of the invention resides in the locking of the two pistons together so that they act as one piston. It is of course obvious that the two cylinders might be independent, one being controlled by the other, without departing from the spirit of the invention.

Modifications and changes may be made without departing from the scope of the invention and I do not limit myself to the exact construction which I have illustrated as the invention can be applied in various other ways.

Having thus described my invention, I declare that what I claim as new and desire to secure by Letters Patent, is:

1. In an air brake, the combination with a main and an auxiliary cylinder each having pistons, of a brake rod directly connected with the auxiliary piston, a port from the auxiliary cylinder to the main cylinder controlled by the auxiliary piston, and means for rigidly connecting the main piston with the brake rod when pressure is admitted therein, substantially as described.

2. In an air brake, the combination with a main and an auxiliary cylinder each having pistons acting on a common brake rod, of means for first moving the auxiliary piston to cause the brake to bear on the wheels and then admitting pressure to the main cylinder by opening a port therein to apply braking pressure, substantially as described.

3. In an air brake, the combination with a main and an auxiliary cylinder each having pistons acting on a common brake rod, of means for first moving the auxiliary piston to cause the brake to bear on the wheels and then admitting pressure through a port in the auxiliary cylinder to the main cylinder to apply braking pressure, substantially as described.

4. In an air brake, the combination with a main brake piston, of an auxiliary piston for taking up the slack, and means for applying the brake through both pistons, pressure in the main piston being admitted through a port in the auxiliary piston, substantially as described.

5. In an air brake, the combination with a main brake piston, of an auxiliary piston at all times directly connected with the brake rod for taking up the slack, means for locking the pistons together, and means for then actuating both pistons to apply the brake, substantially as described.

6. In an air brake, the combination with a main cylinder, of an auxiliary cylinder extending partly within the main cylinder, a brake rod extending through both cylinders and carrying a piston working in the auxiliary cylinder, a port in said cylinder leading to the main cylinder and controlled by said piston a piston in the main cylinder and means rigidly connecting the main piston with the brake rod when the port is open, substantially as described.

7. In an air-brake, the combination with a main brake cylinder adapted to directly actuate mechanism to apply a brake, of auxiliary mechanism actuated directly by the brake applying devices to first take up the slack and thereupon opening a port and permitting the admission of pressure to the main cylinder to apply the brake, substantially as described.

8. In a brake mechanism, the combination with a brake rod, of means actuated by the brake applying devices to move the brake rod and the brake against the wheel with a relatively light pressure to take up the slack, and brake applying devices for applying fluid braking pressure to said rod by opening a port at the end of the movement of said slack taking up devices, substantially as described.

In testimony whereof I affix my signature, in presence of two witnesses.

FRANK B. RAE.

Witnesses:
F. A. CURTISS,
F. C. TOLES.